US011633889B2

(12) United States Patent
Schuster (10) Patent No.: US 11,633,889 B2
(45) Date of Patent: Apr. 25, 2023

(54) ASSEMBLY APPLIANCE FOR MOULD TOOL PARTS OF AN INJECTION MOULDING TOOL, AN INJECTION MOULDING TOOL AND AN INJECTION MOULDING MACHINE (71) Applicant: ALPLA Werke Alwin Lehner GmbH & Co. KG, Hard (AT)

(72) Inventor: Markus Schuster, Hard (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 254 days.

(21) Appl. No.: 16/786,126

(22) Filed: Feb. 10, 2020

(65) Prior Publication Data
US 2020/0171719 A1  Jun. 4, 2020

Related U.S. Application Data (63) Continuation of application No. PCT/EP2018/070018, filed on Jul. 24, 2018.

(30) Foreign Application Priority Data

Aug. 11, 2017  (CH) .................................... 01020/17

(51) Int. Cl.
*B29C 45/06* (2006.01)
*B29C 45/16* (2006.01)
(Continued)

(52) U.S. Cl.
CPC ........ *B29C 45/062* (2013.01); *B29C 45/1628* (2013.01); *B29C 45/1742* (2013.01); *B29C 45/1761* (2013.01); *B29C 2045/0458* (2013.01)

(58) Field of Classification Search
CPC . B29C 45/006; B29C 45/045; B29C 45/1418; B29C 45/1628; B29C 45/2606; B29C 45/32
See application file for complete search history.

(56) References Cited

U.S. PATENT DOCUMENTS 6,709,251 B2 * 3/2004 Payette ............... B29C 45/1628
                                                   425/576
7,484,948 B2   2/2009 Wimberger
(Continued)

FOREIGN PATENT DOCUMENTS

CN      101065228 A    10/2007
DE   102011103609 A1   12/2012
(Continued)

OTHER PUBLICATIONS

Office Action dated Jul. 21, 2021, by the Chinese Patent Office in corresponding Chinese Patent Application No. 201880051847.9, and an English Translation of the Office Action. (11 pages).
(Continued)

*Primary Examiner* — Joseph S Del Sole
*Assistant Examiner* — Thu-Khanh T. Nguyen
(74) *Attorney, Agent, or Firm* — Buchanan Ingersoll & Rooney PC (57) ABSTRACT An assembly appliance for mould tool parts of an injection moulding tool is disclosed, the assembly appliance including an assembly plate configured for insertion into an injection moulding machine and including a tool carrier for receiving first mould tool parts to be assembled; and an assembly frame having a guide system for a translatory displacement of the assembly plate along a longitudinal extension of the assembly frame, and a support device for stationary support of a second mould tool part which corresponds to at least one of the first mould tool parts.

22 Claims, 3 Drawing Sheets (51) Int. Cl.
    *B29C 45/17*    (2006.01)
    *B29C 45/04*    (2006.01)

(56) References Cited

U.S. PATENT DOCUMENTS

| | | | |
|---|---|---|---|
| 7,833,008 B2 | 11/2010 | Wimberger | |
| 8,215,941 B2 | 7/2012 | Araujo | |
| 8,672,668 B2 * | 3/2014 | Armbruster | B29C 45/006 |
| | | | 425/556 |
| 8,764,434 B2 * | 7/2014 | Armbruster | B29C 45/1628 |
| | | | 425/574 |
| 2006/0244178 A1 | 11/2006 | Armbruster | |
| 2007/0212445 A1 | 9/2007 | Wimberger | |
| 2009/0169673 A1 | 7/2009 | Wimberger | |
| 2010/0171237 A1 | 7/2010 | Armbruster | |
| 2012/0328730 A1 * | 12/2012 | Armbruster | B29C 45/1628 |
| | | | 425/542 |
| 2014/0308388 A1 * | 10/2014 | Armbruster | B29C 45/1628 |
| | | | 425/577 |
| 2015/0321401 A1 * | 11/2015 | Schad | B29C 45/1742 |
| | | | 425/182 |

FOREIGN PATENT DOCUMENTS

| | | |
|---|---|---|
| EP | 1277557 A1 | 1/2003 |
| EP | 1306185 A1 | 5/2003 |
| EP | 1973721 A2 | 10/2008 |
| JP | 2749536 B2 | 5/1998 |
| JP | 2001038768 A | 2/2001 |

OTHER PUBLICATIONS

Office Action dated Sep. 15, 2021, by the Indian Patent Office in corresponding Indian Patent Application No. 202017005442. (8 pages).

International Search Report (with English Translation) and Written Opinion issued in corresponding International Patent Application No. PCT/EP2018/070018, 11, pages (Oct. 9, 2018).

* cited by examiner

ASSEMBLY APPLIANCE FOR MOULD TOOL PARTS OF AN INJECTION MOULDING TOOL, AN INJECTION MOULDING TOOL AND AN INJECTION MOULDING MACHINE

RELATED APPLICATION

This application claims priority as a continuation application under 35 U.S.C. § 120 to PCT/EP2018/070018, which was filed as an International Application on Jul. 24, 2018 designating the U.S., and which claims priority to Swiss Application 01020/17 filed in Switzerland on Aug. 11, 2017. The entire contents of these applications are hereby incorporated by reference in their entireties.

FIELD

The present disclosure relates to an assembly appliance for mould tool parts of an injection moulding tool. Furthermore, the present disclosure also relates to an injection moulding tool and to an injection moulding machine.

BACKGROUND INFORMATION

Injection moulding is a method which is used quite often for the largely fully automatic manufacture of plastic parts. It is applied for mass articles as well as for technical plastic parts. Herein, plastic parts of the most varied of sizes can be manufactured, for example constituents of watch mechanisms or also constituents of car bodies. In many cases, a post-machining of the manufactured plastic parts is no longer necessary. The injection moulding can include the plasticisation of a powder-like or granulated plastic material and bringing it at a high pressure into a mould cavity of an injection moulding tool. The plasticised plastic material which is injected into the tool cavity solidifies there by way of cooling and/or cross-linking, so that it can finally be removed from the mould. The steps which are used for the manufacture of an injection moulded plastic part as a rule take their course in a fully automatic manner, and form a cycle with respective cycle times during which the periodically effected manufacturing procedure takes place.

A standard injection moulding machine as a rule involves two main elements. On one hand an injection assembly with an injection unit, by which plastic granulate is processed and injected under pressure into an injection moulding tool, and on the other hand a closure unit, by which the injection moulding tool is opened and closed. As a rule, the closure unit includes three plates which are arranged perpendicularly in one axis on a machine frame. A fixed mould clamping plate carries a first mould tool part of the injection moulding tool (nozzle side) and includes a feed-through, through which a nozzle of the injection unit can be moved and docked onto the injection moulding tool. The second plate is a movable mould clamping plate, also called closure plate. A second mould tool part of the injection moulding tool (ejector side) is assembled on this plate. The movable closure plate can be displaced mechanically and/or hydraulically in a direction of the fixed mould clamping plate towards and away from this, in order to open or close the injection moulding tool. A third plate is a face plate with a supporting function. A toggle lever and/or a hydraulic cylinder are located between the stationary face plate and the movable closure plate, in order to carry out the displacement of the closure plate along the axis.

For many applications of the injection moulding method, it has been found to be advantageous if one half of the injection moulding tool is rotatable relative to a second half, in order for example to be able to inject a plastic melt which is to be processed, into the injection moulding tool from two injection assemblies which lie opposite one another along the axis. The rotatable injection moulding tool half herein at its two sides which lie axially opposite one another can include first mould cavities which interact with corresponding second mould cavities on an injection moulding tool half which is fastened to the fixed mould clamping plate or with a further injection moulding half which is fastened to the movable closure plate or mould clamping plate. Herewith, plastic parts of differently coloured plastic melts or of plastics which differ from one another, so-called 2-component plastic parts, can be manufactured. In the case of a single injection assembly, a rotatable half of the injection moulding tool entails the advantage of a more rapid cycle time. After a first injection cycle, the rotatably mounted mould tool half can be rotated and the previously injected plastic parts can cool and be ejected whilst a second injection cycle is already taking place.

Injection moulding machines which include a prismatically designed, rotatable tool carrier which is arranged between mould clamping plates, specifically a stationary mould clamping plate and a closure plate which is axially displaceable relative thereto, are already known. The prismatic tool carrier includes at least four side surfaces and is rotatable about a rotation axis which is perpendicular to a plane which is spanned by linear guides, along which the closure plate is displaceable. First mould tool parts are arranged on the prismatic tool carrier and interact with second mould tool parts which are assembled on the stationary mould clamping plate or on the translatorily displaceable mould clamping plate or closure plate. The prismatic tool carrier can include different functional units. Hence first mould tool parts which in the closed state serve for receiving the injected plastic mass can be assembled on the two sides of the tool carrier which lie opposite the mould clamping plates for the second mould tool parts. After a rotation about 90° with respect to the mould clamping plates, an ejecting function of the rotatable tool carrier can be activated whilst an injecting of the plastic melt into the closed mould tool parts is simultaneously effected at the two sides of the tool carrier which lie opposite the mould clamping plates.

Injection moulding tools need to withstand high closure pressures and considerable inner pressures on injection moulding. Long service lives during which the injection moulding tools are opened and closed again innumerable times over their operating lives are also demanded. For this reason, injection moulding tools are designed in a very solid manner. Herein, each of the tool parts can weigh several metric tons. The handling of the mould tool parts and their assembly entail a significant amount of effort. Furthermore, the first and the second mould tool parts must be aligned to one another in an exact manner, in order to ensure the desired accuracy concerning the manufacturing tolerances and the uniformity of the injection moulded plastic parts. For this reason, a considerable amount of adjustment effort is invested for the insertion, exchange or retrofitting of the injection moulding tool as far as known injection moulding machines are concerned and particularly those with rotatable tool carriers, wherein such effort is time-intensive and costly.

SUMMARY

An assembly appliance is disclosed for mould tool parts of an injection moulding tool, the assembly appliance comprising: an assembly plate configured for insertion into an injection moulding machine and including a tool carrier for receiving first mould tool parts to be assembled; and an assembly frame having a guide system for a translatory displacement of the assembly plate along a longitudinal extension of the assembly frame and a support device for stationary support of a second mould tool part which corresponds to at least one of the first mould tool parts.

BRIEF DESCRIPTION OF THE DRAWINGS

Further advantages and exemplary embodiment variants will be apparent from the subsequent description of an exemplary embodiment with reference to the schematic drawings in a representation which is not true to scale, and wherein.

In the drawings, the same objects are each provided with the same reference numerals.

DETAILED DESCRIPTION

Exemplary embodiments as disclosed herein can eliminate long fitting and retrofitting times and costs on insertion, removal or exchange of injection moulding tools as well as reduce the effort for adjustment of the mould tool parts to one another. The handling of the mould tool parts and their assembly in an injection moulding machine can also be simplified.

As disclosed herein, an assembly appliance for mould tool parts of an injection moulding tool, can include an assembly plate which can be inserted into an injection moulding machine and on which a tool carrier for receiving first mould tool parts can be assembled. The assembly plate is arranged on an assembly frame which includes a guide system for a translatory displacement of the assembly plate along a longitudinal extension of the assembly frame. Furthermore, the assembly frame includes a support device for a second mould tool part which can be arranged in a stationary manner and which corresponds to at least one of the first mould tool parts.

Due to the fact that the assembly frame is already provided with a guide system for a translatory displacement of the assembly plate for the tool carrier and includes a support device for a second mould tool part, first mould tool parts which are arranged on the tool carrier and on the support device can already be pre-adjusted before the assembly appliance is inserted into the injection moulding machine. The guide system is a constituent of the assembly appliance. For this reason, on adjusting the first and second mould tool parts to one another, one does not need to take into consideration any guide elements and displacement devices of the injection moulding machine. The machine bed or the guide elements of the injection moulding machine merely then serve for the resting and support of the lower side of the assembly frame of the assembly appliance. The first and second mould tool parts which are assembled on the tool carrier and on the support device can therefore be adjusted completely independently of the injection moulding machine. The mould tool parts which are adjusted to one another are assembled on the tool carrier. The assembly appliance can be inserted into the injection moulding machine or removed from the injection moulding machine without the disassembly and/or assembly of construction parts (neither on the commercially available injection moulding machine nor on the assembly appliance). Hereby, one can fall back on commercially available, universally usable injection moulding machines which also operate with other injection moulding tools. Conversions or specialisations of the injection moulding machines are accordingly done away with.

After the insertion of the assembly appliance, the effort for a final adjustment of the mould tool parts can be limited to a minimum. The effort can be limited to the one-off adaption of the injection moulding tool to the injection moulding machine, in order to compensate the tolerances which vary from injection moulding machine to injection moulding machine. By way of this, fitting and retrofitting times of the injection moulding machine and the costs and production stoppage times of the injection moulding machine which these entail can be reduced. The exemplary assembly frame with the mould tool parts requires no greater set-up effort in the injection moulding machine than any other injection moulding machine. The exemplary assembly frame can be configured as one piece, but can also be configured in a multi-part manner.

An exemplary embodiment variant of the assembly appliance envisages the assembly frame at a lower side which is away from the assembly plate being provided with support elements which serve for the support with respect to the machine bed of the injection moulding machine. Herein, the support elements can be arranged on the two longitudinal sides of the lower side of the assembly frame and serve for compensating unevenesses of the machine bed of the injection moulding machine or of guide elements which are arranged there, such as e.g. guide rails or the like. Herein, greater unevenesses can be simply compensated by way of a corresponding use of differently thick support elements. The support elements can be for example adjustment shims of a quality steel. These can also be hardened.

For an exact alignment of the assembly frame in relation to a machine axis of the injection moulding machine, in an exemplary embodiment variant of the assembly appliance one can envisage the assembly frame can on its one longitudinal end include a face side which is configured for a releasable connection to a fixed mould clamping plate of an injection moulding machine. For this, for example a connection plate which projects beyond an upper side of the assembly frame and is releasably connectable, for example, screwable to the mould clamping plate can be assembled on the face side of the assembly frame.

In an exemplary embodiment of the assembly appliance, the guide system of the assembly frame includes two guide rails which run parallel to its longitudinal extension and which are arranged on an upper side of the assembly frame, as well as an adjustment appliance for the assembly plate. The assembly frame has its own guide rails for the displacement of the assembly plate along the longitudinal extension of the assembly frame. The guide elements which are provided in the injection moulding machine, such as e.g.

guide rails, in contrast have no guidance function for the assembly appliance. Their purpose is for the resting and support of the assembly frame which carries the assembly plate. For displacing the assembly plate along the longitudinal extension of the assembly frame, it is not adjusting devices which are arranged on the injection moulding machine which are used, but the assembly appliance has its own adjustment appliance which can be operated essentially independently of the adjusting devices of the injection moulding machine.

In an exemplary embodiment variant of the assembly appliance, the assembly plate itself can be mounted on a displacement plate. The displacement plate is herein supported on the guide rails on the upper side of the assembly frame. The assembly plate can be displaced together with the displacement plate in the longitudinal direction of the assembly frame. Given an assembly appliance inserted into an injection moulding machine, the longitudinal direction of the assembly frame runs essentially parallel to the machine axis of the injection moulding machine. By way of the assembly plate being mounted on the displacement plate, the fastening function for the tool carrier and the adjusting function are decoupled from one another. The displacement plate is alone responsible for the translatory displacement. In contrast, the assembly plate serves for fastening the tool carrier and can be configured for further degrees of freedom of movement of this, for example, rotation movements.

In an exemplary further embodiment variant of the assembly appliance, the assembly plate can be assembled on a rotation unit which passes through the displacement plate. The assembly plate and the tool carrier which is possibly assembled thereon are then rotatable about a rotation axis which runs perpendicularly to an upper side of the displacement plate. The upper side of the displacement plate herein runs essentially parallel to a plane which is spanned by the guide system, such as guide rails, along which system the translatory displacement of the displacement plate is effected. Given an assembly appliance inserted into an injection moulding machine, the translatory displacement of the displacement plate is effected parallel to the direction of the machine axis of the injection moulding machine. The machine axis can run in the horizontal direction. The rotation axis of the assembly plate then extends in the vertical direction perpendicularly to this.

In an exemplary embodiment variant of the assembly appliance with a displacement plate which is arranged on an assembly frame and with an assembly plate which is rotatably mounted with respect to this, the rotation unit includes a multi-pole electric motor with a stator and with a rotor. The multi-pole electric motor is for example, configured as a so-called torque motor. Herein, the rotor is connected to the assembly plate in a rotationally fixed manner. The torque motor can be configured in an internal rotor construction manner. Herein, the rotor rotates within the stator. The rotor and the stator are hereby each configured as a hollow cylinder. The torque M of a torque motor, with a given force action F is dependent on the radius according to the mathematical relation M=F×r. Although a torque motor with an external rotor construction manner can produce a larger torque than an electric motor of an equal construction size with an inner-lying rotor, the size of the motor is sufficient, in order to also be able to rotate tool carriers with mould tool parts with a total weight of up to about 10 metric tons at an adequate speed. It should be noted that a support of the tool carrier or of the mould tool parts which are arranged on it, for example in the form of a mounting or by way of tie-bars at its side which lies opposite the fastening to the assembly plate, is also unnecessary and therefore absent even given this high weight. A torque motor is a brushless permanently excited D.C. motor and is therefore wear-free. The maximal achievable torque of a torque motor can be additionally influenced by a change of its axial construction height. This means that an increase in the torque of the motor can be carried out solely by way of an exchange and without further changes on the assembly appliance.

Basically, the rotation of the assembly plate could also be effected for example via a ring gear which is connected to the assembly plate and is rotatable via a pinion which meshes into the ring gear and which is driven for example by way of a hydraulic drive. Such a mechanical drive however does not have such a high positioning accuracy as a torque motor, in particular on account of the play of the teeth which mesh with one another. For this reason, a mechanical drive includes indexing pins which fix the assembly plate on reaching a desired position.

An exemplary variant of the assembly appliance includes a first absolute sensor, for example a rotation angle sensor provided for monitoring the rotation movement of the electric motor. The rotation movement of the assembly plate can be monitored and controlled in a very precise manner with the help of a rotation angle sensor. One can make do without mechanical locking elements, for example indexing pins or the like, between the displacement plate and the assembly plate. An enquiry of the respective position of such indexing pins, specifically moved-in and locked or retracted and released, is also done away with. By way of this, the control of the rotation movement of the assembly plate and of a tool carrier which is assembled thereon is simplified. Furthermore, the cycle time on manufacturing the injection moulded parts is also shortened.

In an exemplary embodiment variant of the assembly appliance, the support device for the stationary second mould tool part can be configured as a carrier slide which is supported on the guide rails on the upper side of the assembly frame and between the assembly plate and a connection device which is arranged on the assembly frame is translatorily displaceable with respect to a stationary mould clamping plate of an injection moulding machine. A nozzle plate which represents the second mould tool part is assembled on the carrier slide. The translatorily displaceable carrier slide simplifies the adjustment of the second mould tool part with respect to the first mould tool part which is assembled on a tool carrier which is assembled on the assembly plate. In this manner, a first mould tool part which is assembled on the tool carrier can be already be aligned exactly onto the second mould tool part or nozzle plate, before the assembly appliance with the tool carrier which is arranged thereon and with the first mould tool part as well as with the carrier slide and the second mould tool part which is arranged thereon can be inserted into the injection moulding machine at all.

After the insertion of the assembly appliance into the injection moulding machine and the fastening of the support plate to the stationary mould clamping plate of the injection moulding machine, the assembly slide is displaced in the direction of the stationary mould clamping plate until the nozzle plate or the second mould tool part bears on the fixed mould clamping plate and can be fixedly screwed to this. By way of the fastening of the assembly frame to the fixed mould clamping plate, this frame is already aligned exactly onto the machine axis of the injection moulding machine. A further adjustment can be dispensed with since the first and the second mould tool parts have already been adjusted to one another before the insertion of the assembly appliance into the injection moulding machine. The translatorily displaceable mould clamping plate or closure plate, with its further second mould tool part which is possibly mounted thereon, is fed into the translatorily displaceable and possibly rotatably mounted tool carrier which has a first mould tool part which is assembled thereon and to adjust this. The adjustment of the further second tool part is herein effected at the translatorily displaceable mould clamping plate. Inasmuch as this is concerned, this adjustment does not differ from the adjustment of injection moulding tools with a mould tool part which is to be arranged on the stationary mould clamping plate and with a mould tool part which is to be arranged on the closure plate.

The translatory displacement of the displacement plate along the guide rails on the upper side of the assembly frame can be effected for example hydraulically. An exemplary embodiment variant of the assembly appliance uses the adjustment appliance for the translatorily adjustable displacement plate including a linear motor. The rotor and the stator of the linear motor do not come into contact with one another. The linear motor is practically wear-free on account of this.

An exemplary embodiment variant of the assembly appliance can include a second absolute sensor, for example a Hall sensor, which monitors the translatory displacement of the displacement plate. By way of the translatory displacement of the displacement plate being monitored and measurable in an absolute manner, the translatory displacement of the displacement plate and the rotation of the assembly plate which is mounted thereon can be carried out simultaneously. Herein, what can be decisive is the fact that the distance of the first mould tool part to the second mould tool parts which are arranged on the stationary and possibly also on the translatorily displaceable mould clamping plate is large enough such that no undesired contact between the first and the second mould tool parts can occur on rotation.

A zero setting which is used for the acquisition of the detection of the absolute translatory displacement values of the displacement plate can be effected for example by way of the displacement plate, after the insertion and fastening of the assembly appliance on the stationary mould clamping plate, being adjusted in the direction of the stationary mould clamping plate until the first and the second mould tool parts are closed. The position of the displacement plate which is herein registered is defined as the zero position, from which the absolute displacement values can be measured.

Additionally, a sensor for detecting the exact position of the translatorily displaceable mould clamping plate can yet also be arranged on the displacement plate. The absolute measured values which are detected by this sensor can likewise be related to the defined zero position of the displacement plate. Synchronised translatory displacements and rotations of the assembly plate with an equipped tool carrier which is assembled thereon are rendered possible by an assembly appliance which is designed in such a manner. The rotations of an equipped tool carrier by 90° can be carried out for example in approx. 0.7 s to 0.8 s. Rotations by 180° can be accomplished for example in approx. 1.2 s; this being the case with a weight of the tool carrier which is equipped with the first mould tool parts of up to about 10 metric tons.

Concerning an assembly tool which is equipped for rotation with a torque motor having an internal rotor construction manner, the rotor can be configured in the shape of a hollow cylinder and include, for example, a centrally arranged feed-through for the supply conduits/leads for media and electrical energy, as well as for control leads. A very space-saving configuration results as a consequence of this arrangement of the supply and control conduits/leads, and can be particularly easy to handle. The supply and control conduits/leads can be led from the lower side of the assembly tool or also from the upper side. The length and width sides of the tool can be freely accessible due to this. The feed-through can be configured for receiving at least one pair of first supply conduits for the feed and discharge of cooling water, at least one pair of second supply conduits for the feed and discharge of hydraulic oil, at least one supply conduit for the feed of compressed air, at least one supply lead for electrical energy and at least one control lead.

According to an exemplary embodiment, the feed-through is configured as a rotary feed-through. The rotary feed-through permits an unlimited number of rotations and no limitation of the rotation direction, since the lead-in part as well as the lead-out part, to which the supply leads/conduits and the at least one control lead are fixedly connected, are stationary.

According to an exemplary embodiment, an injection moulding tool with a first mould tool part and at least one second mould tool part are involved, these in the closed state delimiting at least one mould cavity, wherein the second mould tool part can be assembled on a stationary mould clamping plate of an injection moulding machine. Hereby, the first mould tool part is fastened to a tool carrier which is assembled on an assembly plate of an assembly appliance according to an exemplary embodiment. The second mould tool part can be fastened on a support device on the described assembly appliance. An injection moulding tool which is configured in such a manner can already be adjusted before the insertion into an injection moulding machine. The adjustment effort after the insertion can be significantly reduced and accordingly can involve a significantly lower time effort and investment cost. The injection moulding tool can be inserted into commercially available injection moulding machines with guide tie-bars just as well as into commercially available injection moulding machines without tie-bars. It can be used in single-component injection moulding machines or also in two-component or multi-component injection moulding machines.

In an exemplary embodiment, the injection moulding tool can include a prismatically configured tool carrier which is rotatable in a predefined manner about a rotation axis which runs perpendicularly to a displacement plane. Such injection moulding tools are also known under the description cube tools. The particularity of the suggested cube tool is that it has its own translatory and rotatory adjustment device and is only reliant on an adjustment device of the injection moulding machine to a limited extent, for example for feeding the translatorily mountable mould clamping plate. In an exemplary embodiment of such an injection moulding tool, the tool carrier includes at least 4 side surfaces which run parallel to its rotation axis and are aligned perpendicularly to one another. First mould tool parts can be assembled at least on two sides of the tool carrier which lie opposite one another. In an exemplary embodiment variant, all four side surfaces can be equipped with mould tool parts and additional components, such as e.g. ejectors, covers which in the opened state close injected closures, etc. With regard to the suggested injection moulding tool, the upper side of the tool carrier which is away from the assembly plate is also freely available due to the absence of support elements such as mountings, which are no longer necessary. What can be accommodated there are for example the components which are necessary for the translatory displacement and for the rotation movement of the tool carrier which is assembled on the assembly appliance.

An injection moulding tool which is assembled on an assembly appliance according to the exemplary embodiment outlined herein is translatorily and rotationally displaceable essentially simultaneously. The cycle time can be reduced by way of this.

An exemplary embodiment variant of the injection moulding tool includes at least one valve block for the feed, discharge and distribution of a hydraulic medium, and a cooling fluid and compressed air arranged within and/or on an upper side of a prismatically configured tool carrier which lies opposite the assembly plate. By way of this, the injection moulding tool can be operated largely autonomously of the distributors/manifolds for hydraulics, coolant and pneumatics, the distributors/manifolds being provided on the injection moulding machine. This type of design has been found to be advantageous, in particular with cube tools which are mounted on a translatorily displaceable and rotatable assembly plate which for the rotation movement is configured with a torque motor having an internal rotor construction manner. A rotation feed-through for supply conduits for gaseous and liquid media and electrical energy, as well as for control leads can then be arranged in the central free region of the rotor which is designed in the shape of a hollow cylinder. Herein, at least one pair of first supply conduits for the feed and discharge of cooling water, at least one pair of second supply conduits for the feed and discharge of hydraulic oil, at least one supply conduit for compressed air, at least one supply lead for electrical energy and at least one control lead are provided.

According to an exemplary embodiment, an injection moulding machine with an assembly appliance for an injection moulding tool according to an exemplary embodiment variant includes an injection moulding machine with a translatorily displaceable mould clamping plate. The translatory displacement of the assembly plate is essentially parallel to the translatory displacement of the mould clamping plate. Herewith, the direction of the displacement of the translatorily displaceable mould clamping plate and the direction of the translatory displacement of the assembly plate are essentially parallel. Since the longitudinal extension of the injection moulding tool and the longitudinal extension of the injection moulding machine are essentially parallel to one another, the injection moulding tool can be inserted into the injection moulding machine from above or from the side without at least a partial disassembly of the injection moulding tool. By way of this, the insertion, removal or exchange of injection moulding tools is simplified and demands a reduced time and capital investment compared to known injection moulding machines. This is also particularly the case for injection moulding machines which are equipped with an injection moulding tool according to exemplary embodiments outlined herein. The constituents of the injection moulding tool which are arranged on the suggested assembly appliance have a very high intrinsic stiffness. Independently of the tool weight, one can make do without an upper-lying support, such as e.g. additional tie-bars, for preventing a tilting.

According to an exemplary embodiment, at least one plasticising unit for plasticising a powder-like or granulated plastic material and for bringing it at a high pressure into the mould cavity which is formed by the first mould tool part which is assembled on the translatorily displaceable mould clamping plate and by the second mould tool part which is arranged on the tool carrier, is fixedly connected to the translatorily displaceable mould clamping plate. Herewith, the first mould tool part can be fixedly connected to the plasticising unit. Hereby, several plasticising units can also be connected to the translatorily displaceable mould clamping plate. Injection moulded parts can be configured in a two-component or multi-component manner by way of this. The plasticising unit can be arranged at any arbitrary angle with respect to the longitudinal axis of the injection moulding machine. A longitudinal axis of the plasticising unit can be in or parallel to a plane which is perpendicular to a plane which is spanned by the guide system of the injection moulding machine.

According to an exemplary embodiment, the translatorily displaceable mould clamping plate can be displaced from a closed position into an open position, and vice versa, by a predefined first distance. The assembly plate can be displaced from a closed position into an open position, and vice versa, by a second distance. Hereby, the first distance is essentially twice as large as the second distance. Since the first and the second distance are covered essentially within the same time window, it results that the travel speed of the assembly plate is roughly half the magnitude as that of the travel speed of the translatorily displaceable mould clamping plate.

According to an exemplary embodiment, the translatory displacement and a rotatory movement of the assembly plate can begin essentially simultaneously. The cycle time can be reduced by way of this since the translatory and rotatory movement can be carried out essentially within the same time window.

According to an exemplary embodiment, an injection moulding machine with a mould clamping plate which is translatorily displaceable along guide rails and with a stationary mould clamping plate with an injection moulding tool according to one of the preceding exemplary embodiments is suggested. The injection moulding tool lies on the guide rails and is releasably connected to the stationary mould clamping plate. After the injection moulding tool has once been adapted to the commercially available injection moulding machine, further adjustments after an exchange of the injection moulding tool are not necessary. It is indeed due to the use of the machine-side guide system as a rest for the suggested injection moulding tool that a high repetition accuracy is given on inserting the suggested injection moulding tool into the injection moulding machine. It is precisely the lying on the guide system of the injection moulding tool and the fastening of the suggested injection moulding tool to the stationary mould clamping plate which can prevent stresses in the injection moulding tool.

Figure 1:
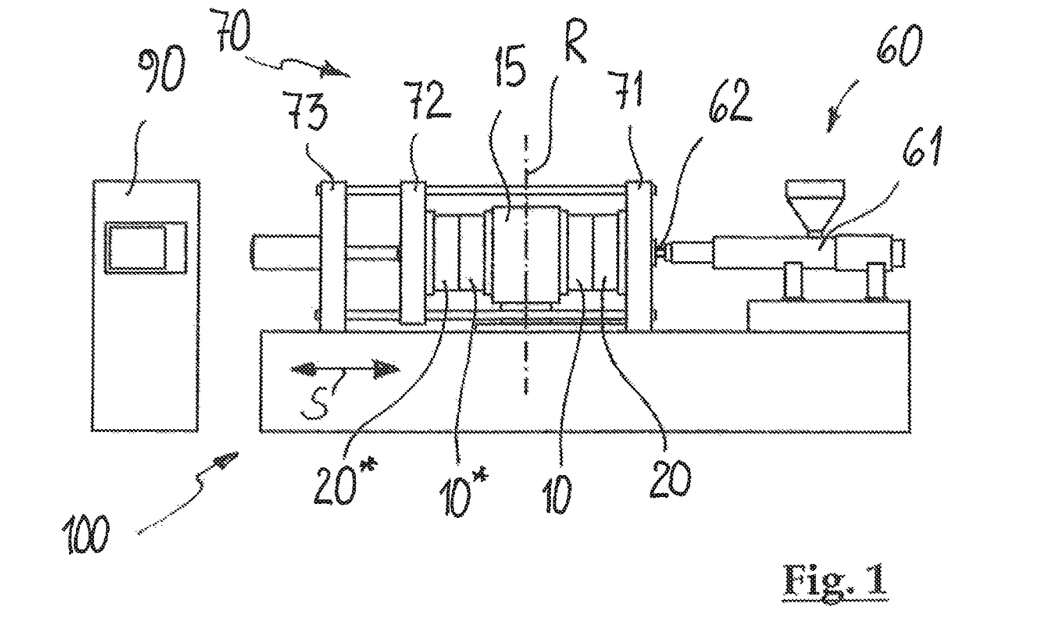
FIG. 1 is a principle representation of an exemplary injection moulding machine with a cube tool.

A commercially available injection moulding machine with an injection moulding tool which according to the present exemplary embodiment is configured as a cube tool,is provided in its entirety with the reference numeral 100 in FIG. 1. The injection moulding machine 100 has a so-called horizontal construction with a machine frame, on which an injection assembly 60 with a plasticising unit 61 together with an associated injection unit 62 and a closure unit 70 are arranged. The closure unit 70 can include (e.g., consist of) a stationary mould clamping plate 71 which belongs to the injection assembly, of a translatorily displaceable mould clamping plate 72 which lies opposite the stationary mould clamping plate 71 and which is also denoted as a closure plate, and of a support plate 73 on which the translatorily displaceable mould clamping plate 72 or closure plate is supported during its translatory displacement along a first direction S.

A hydraulically actuatable toggle lever which is not specifically represented here is arranged between the support plate 73 and the translatorily displaceable mould clamping plate 72. The representation of at least one plasticising unit which is fixedly connected to the translatorily displaceable mould clamping plate 72 has also been foregone. An injection moulding tool which in FIG. 1 is represented in the closure position of the movable mould clamping plate 72 is arranged between the stationary mould clamping plate 71 and the translatorily displaceable mould clamping plate 72. The injection moulding tool which is represented by way of example and which can be designed and configured as a cube tool is composed of two first mould tool halves 10, 10\* which are each assembled on longitudinal sides of a prismatic tool carrier 15 which lie opposite one another, and of two second tool parts 20 and 20\* which correspond to the first mould tool parts 10, 10\* respectively and which on the one hand are assembled on the stationary mould clamping plate 71 and on the other hand on the translatorily displaceable mould clamping plate 72. The first and the second mould tool parts **10, 10\*, 20, 20\*** each delimit at least one mould cavity which is not represented in more detail.

A usually powder-like or granulated plastic material is brought into a flowable state in the plasticising unit 61. The flowable plastic material then via the injection assembly 60 is injected at a high pressure into the mould cavity which is not represented in more detail and which is delimited by the second mould tool part 20 which is assembled on the stationary mould clamping plate 71 and by the adjacent first mould tool part 10 which is assembled on the side of the prismatic tool carrier 15 which faces the stationary mould clamping plate 71. For opening the mould cavity, the first 10, 10\* and the second mould tool parts 20, 20\* are moved apart in the longitudinal direction of the injection moulding machine 100 which is indicated by the double arrow S. Herein, the translatorily displaceable mould clamping plate 72 as well as the prismatic tool carrier 15 is translatorily displaced. Herein, the movable mould clamping plate 72 is translatorily displaced to such an extent that the mould cavities which are delimited by the second mould tool part 20\* which is assembled on the translatorily displaceable mould clamping plate 72 and by the first mould tool part 10\* which is assembled on the prismatic tool carrier are also opened.

In the opened or moved-apart state of the stationary mould clamping plate 71, of the prismatic tool carrier 15 and of the movable mould clamping plate 72, the prismatic tool carrier 15 is rotated about its rotation axis R which is essential perpendicular to a plane which is spanned by a guide system for the translatory displacement of the closure plate 72, the guide system not being specifically represented here. After a rotation for example by 180°, the first mould tool part 10 which firstly faces the stationary mould clamping plate 71 gets into the vicinity of the translatorily displaceable mould clamping plate 72 or the second mould tool part 20\* which is assembled there. The first mould tool part 10\* which is arranged on the opposite side of the prismatic tool carrier 15 then lies opposite the stationary mould clamping plate 71 or the second mould tool part 20 which is assembled there.

On operation, the first and the second mould tool parts **10, 10\*, 20, 20\* are periodically opened and closed again, in order to close and open the mould cavities of the injection moulding tool 1 which are delimited by these. The direction of the translatorily opening and closure movement is effected along the longitudinal direction S which corresponds to the longitudinal direction of the machine. The displacement movement of the translatorily displaceable mould clamping plate 72 and of the prismatic tool carrier 15 as well as its rotation movement, the plasticiser 61 and the injection unit 62 are controlled via a control 90. The injection moulding machine 100 which is represented by way of example is designed and configured for the manufacture of single-component or multi-component plastic parts and corresponds essentially to today's standards. The stationary mould clamping plate 71 which belongs to the injection assembly can include an opening for the injection unit 62**, in order to feed plasticised plastic to the cavity via the second mould tool part.

Figure 2:
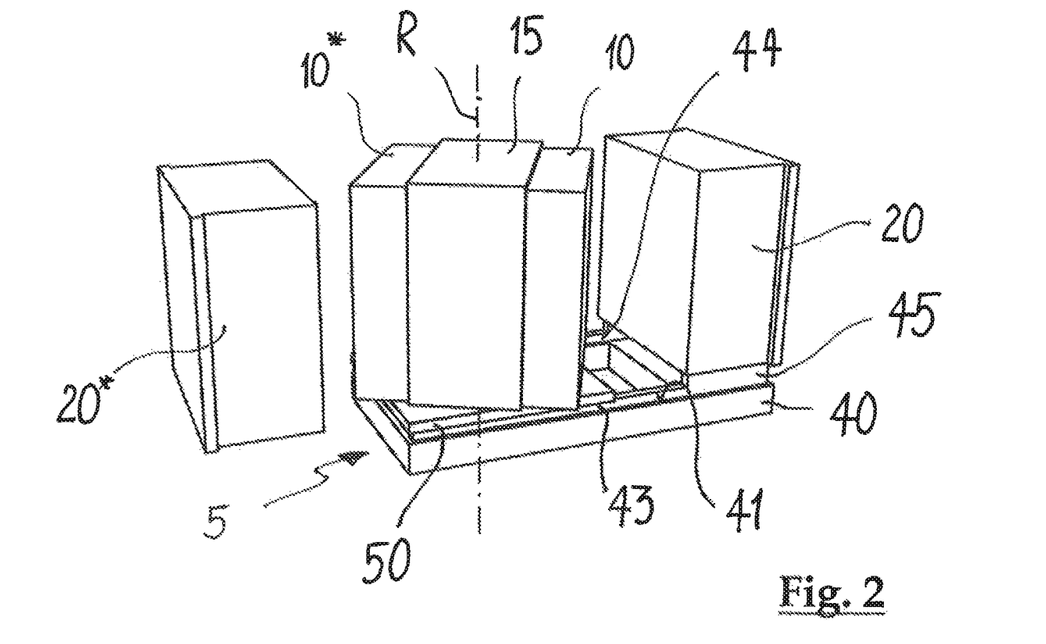
FIG. 2 is a schematic representation of an exemplary cube tool which is mounted on an assembly appliance.

FIG. 2 schematically shows an arrangement of the first and second mould tool parts **10, 10\*, 20, 20\* which corresponds to a cube tool according to FIG. 1. The tool carrier 15 at two sides which are opposite one another had first mould tool parts 10, 10\* and is rotatably mounted on an assembly appliance which is provided in its entirely with the reference numeral 5. The rotatability of the tool carrier 15 about the rotation axis R is indicated in FIG. 2 by the rotated position of the tool carrier 15. Second mould tool parts 20, 20\* are arranged at both sides of the tool carrier 15 which is equipped with the first mould tool parts 10, 10\*. The second mould tool part 20\* on the left side of the tool carrier 15 in FIG. 2 herein corresponds to the second mould tool part which is assembled on the translatorily displaceable mould clamping plate (reference numeral 72 in FIG. 1). The assembly appliance 5 can include an assembly frame 40 with an upper side 41**.

A guide system is arranged on the upper side 41 of the assembly frame 40, the system including two guide rails 43, 44 which run parallel to one another and parallel to a longitudinal extension of the assembly frame 40. A displacement plate 50 which is displaceable in a translatory manner along the guide rails 43, 44 is mounted on the guide rails 43, 44. By way of this, the prismatic tool carrier 15 which is equipped with the first mould tool halves 10, 10\* can be translatorily displaced between the two second mould tool halves 20, 20\*. Within an injection moulding machine, the direction of the translatory displacement of the displacement plate 50 corresponds to the longitudinal displacement direction (reference numeral S in FIG. 1).

A second mould tool part 20 which is arranged on the right side of the assembly appliance 5 is supported on a support device 45 and is arranged in a stationary manner with respect to the translatorily displaceable tool carrier 15. The arrangement of the rotatably mounted tool carrier 15 which is equipped with the first mould tool parts 10, 10\* and of the second mould tool part 20 which is assembled on the support device 45 permits a very simple adjustment of the mould tool halves 10, 20 in relation to one another. The adjustment can be effected outside the injection moulding machine.

Figure 3:
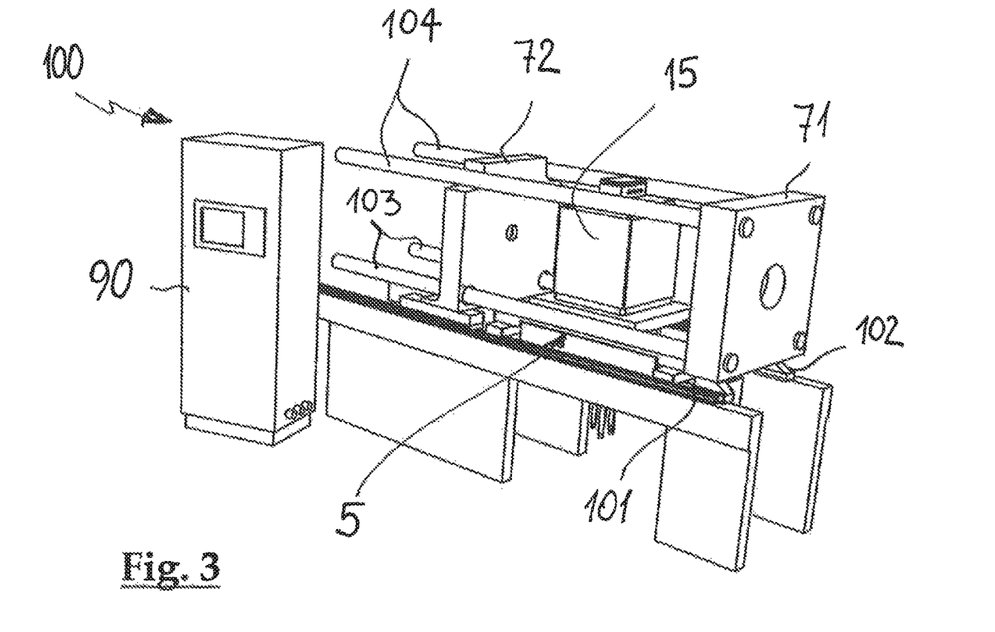
FIG. 3 is a perspective view of an exemplary injection moulding machine tool with a prismatic tool carrier without mould tool parts.

FIG. 3 shows a perspective representation of the prismatic tool carrier 15 which is indicated in FIG. 1, within the injection moulding machine 100. The representation only shows the stationary mould clamping plate 71, the prismatic tool carrier 15 and the translatorily displaceable mould clamping plate 72. A representation of the mould tool parts and of the fixed support plate has been omitted for reasons of a better overview. The prismatic tool carrier 15 is arranged on the assembly appliance 5 which for its part is supported on the machine bed or on rails 101, 102 which run parallel in the longitudinal direction of the injection moulding machine 100. The parallel rails 101, 102 serve for the controlled displacing of the translatorily displaceable mould clamping plate 72.

Concerning the known injection moulding machines, two upper and lower guide tie-bars 103, 104 which serve for guiding the movable mould clamping plate 72 are additionally provided. With regard to known injection moulding machines with a cube tool, the upper guide tie-bars 104 can also serve for supporting the cube tool which can weigh a few metric tons. In contrast to known injection moulding machines, concerning the suggested injection moulding machine 100 the lower and the upper tie-bars 103, 104 do not have a supporting function for the prismatic tool carrier 15. This tool carrier is assembled on the assembly appliance and is free of any further support. By way of this, the assembly appliance 5 with the prismatic tool carrier 15 can be simply inserted into the injection moulding machine and also removed from this again when desired or required.

In exemplary embodiments, the assembly appliance 5 is only supported on the machine bed or on the rails 101, 102 of the injection moulding machine and is neither screwed or connected to the machine bed. A stressing of the assembly appliance 5 is avoided by way of this.

Figure 4:
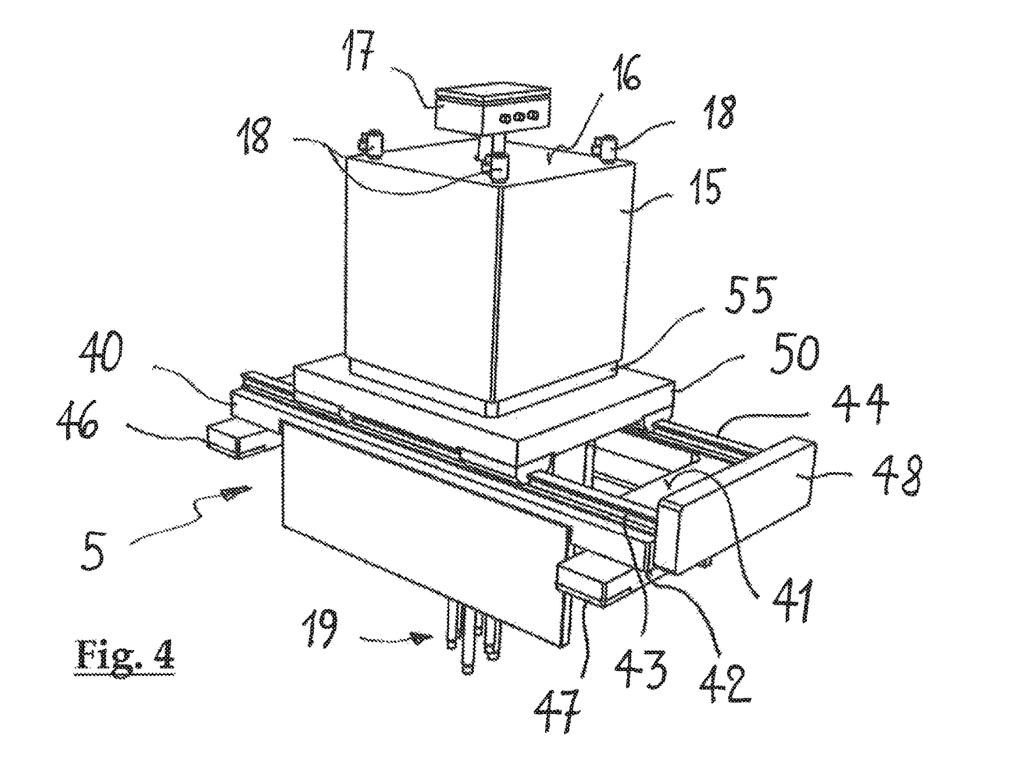
FIG. 4 is a perspective view of an exemplary prismatic tool carrier which is mounted on a suggested assembly appliance.

FIG. 4 shows a prismatic tool carrier 15 which is arranged on the assembly appliance 5. The assembly appliance 5 can include an assembly frame 40 with an upper side 41. A guide system is arranged on the upper side 41 of the assembly frame 40, the guide system including two guide rails 43, 44 which run parallel to one another and to a longitudinal extension of the assembly frame 40. A displacement plate 50 which is translatorily displaceable along the guide rails 43, 44 is mounted on the guide rails 43, 44. An assembly plate 55 is rotatably mounted on the displacement plate 50. The prismatic tool carrier 15 is arranged on the assembly plate 55 and can be screwed to this. Support elements 46, 47 can be arranged on a lower side 42 of the assembly frame 40. The support elements 46, 47 serve for the support of the assembly frame 40 with respect to the machine bed of the injection moulding machine. The support elements 46, 47 can herein be arranged on the longitudinal sides of the lower side 42 of the assembly frame 40 and serve for compensating unevenness of the machine bed of the injection moulding machine or of guide elements such as e.g. guide rails or the like which are arranged there. Herein, greater irregularities can be simply compensated by way of a suitable arrangement of differently high support elements 46, 47. A connection plate 48 which serves for fastening the assembly appliance 5 to the stationary mould clamping plate (reference numeral 71 in FIG. 1) is arranged on a face end of the assembly frame 40. The assembly appliance is aligned to the machine axis of the injection moulding machine after the fastening of the assembly appliance 5 to the stationary mould clamping plate.

FIG. 4 further shows that a valve block 17 for the electrical and pneumatic supply as well as for the desired and/or any necessary electronics is assembled on an upper side 16 of the prismatic tool carrier 15. The cylinders 18 which are indicated at the corners of the upper side 16 are for example hydraulic valves. The conduits 19 which project beyond a lower side 42 of the assembly frame 40 symbolise feed and discharge conduits for hydraulic fluid and for cooling fluid, such as water, conduits of the feed of compressed air as well as leads for the electrical supply and for the necessary electronics. The tool carrier is largely independent of the supply system of the injection moulding machine due to these supply conduits 19 all being arranged on the prismatic tool carrier 15. This permits a simpler and standardised design of the cube tool.

Figure 5:
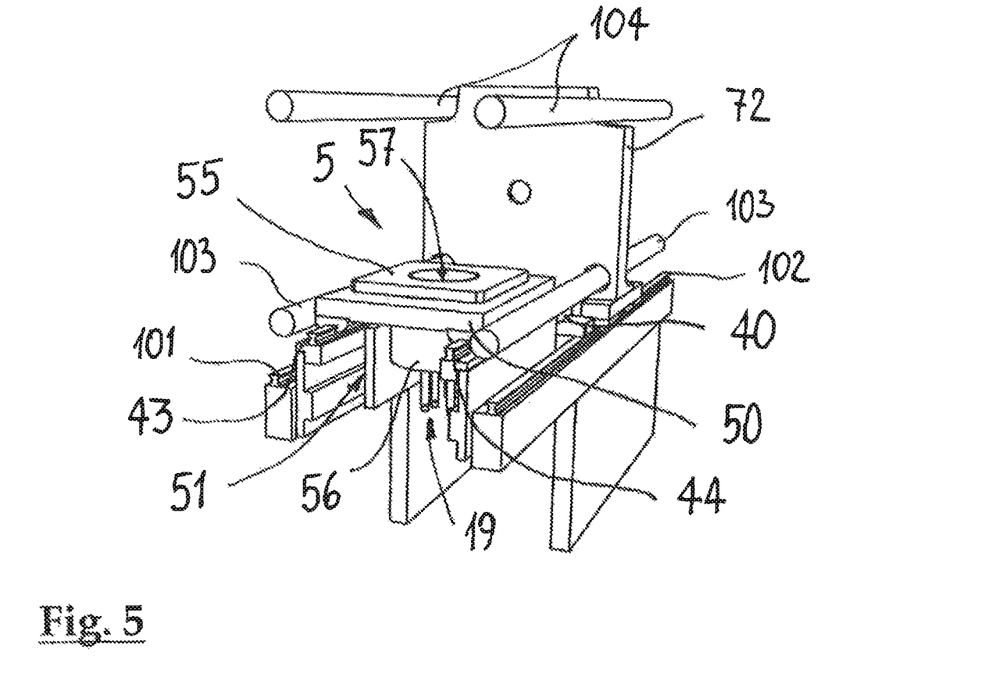
FIG. 5 is a perspective view of an exemplary assembly appliance which is inserted into an injection moulding machine.

FIG. 5 shows a perspective representation of a section of an assembly appliance 5 which is arranged in an injection moulding machine. A representation of the prismatic tool carrier which is arranged on the assembly appliance 5 has been omitted for reasons of a better overview. The assembly frame 40 of the assembly appliance 5 rests on the two parallel rails 101, 102 on the machine bed of the injection moulding machine. The parallel rails 101, 102 serve for the controlled displacement of the translatorily displaceable mould clamping plate 72. The injection moulding machines which are known from the state of the art each can include two upper and lower guide tie-bars 103, 104 which can serve for guiding the movable mould clamping plate 72. With regard to the injection moulding machines with a cube tool which are known, the upper guide tie-bars 104 can also serve for supporting the cube tool which can weigh a few metric tons. In contrast to known injection moulding machines, concerning the exemplary injection moulding machine 100 the lower and the upper tie-bars 103, 104 have no supporting function for the prismatic tool carrier. The guide rails 43, 44 on the upper side of the assembly frame 40 run in the longitudinal direction of the assembly frame 40 and permit a translatory displacement of the displacement plate 50 which is mounted thereon. The assembly plate 55 is rotatably mounted on the displacement plate 50. The tool carrier (reference numeral 15 in FIG. 2) is assembled on the assembly plate 55.

An electrical drive 56, such as a so-called torque motor which passes through the displacement plate 50 is provided for a controlled rotation of the assembly plate 55. The torque motor has, for example, an internal rotor construction manner. Herein, the inner-lying rotor of the multi-pole electric motor 56 connected to the assembly plate 55 in a rotationally fixed manner. The internal rotor construction manner of the torque motor permits a hollow-cylinder-shaped design and configuration of the stator and of the rotor. On account of this, a central feed-through remains free, this being indicated by the reference numeral 57. The central feed-through 57 leaves space for the supply conduits 19 to the prismatic tool carrier (reference numeral 15 in FIG. 4) which is arranged on the assembly plate 55. A first absolute sensor, for example, a rotation angle sensor can be provided for monitoring the rotation movement of the electric motor. A linear motor 51 for example can be provided for the translatory displacement of the displacement plate 50. Herein, the primary part of the linear motor can be connected for example to the displacement plate 50, whilst the secondary part is arranged on the assembly frame 40. Here too, a second absolute sensor such as for example a Hall sensor or a glass scale can also be provided for detecting the position.

Figure 6:
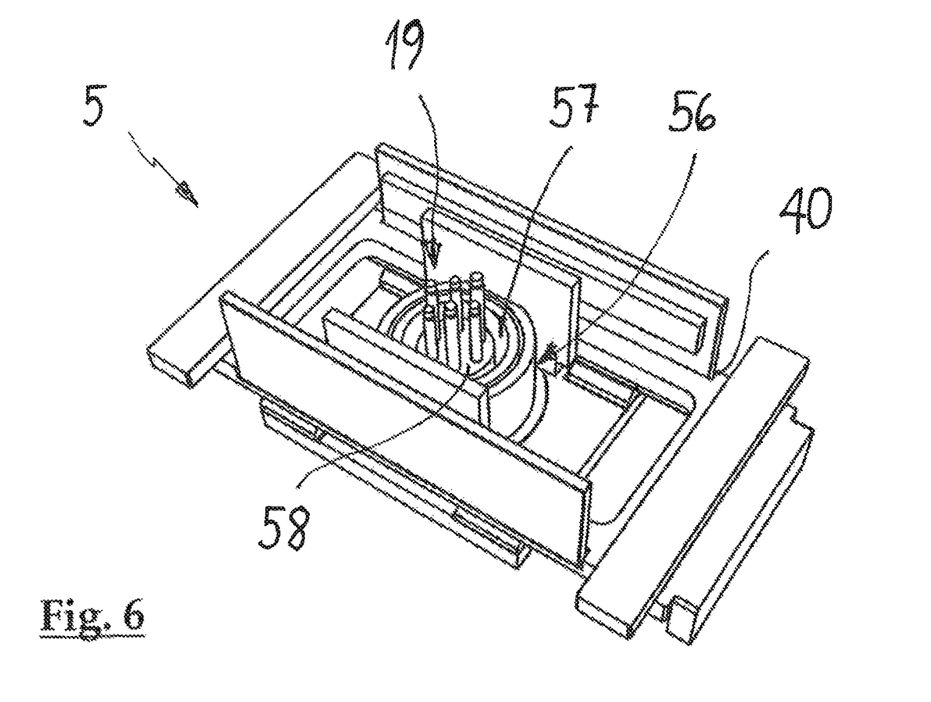
FIG. 6 is an exemplary assembly appliance without a displacement plate and assembly plate.

FIG. 6 shows the assembly appliance 5 without a displacement plate and without an assembly plate. A representation of the guide rails on the upper side of the assembly frame 40 has been forgone. What is clearly recognisable is the electrical rotation drive for the rotatably mounted assembly plate which is not represented, the rotation drive being designed and configured as a torque motor with an internal rotor construction manner. It is also evident from the representation that the stator and the rotor of the electrical drive 56 are each designed in a cylinder-shaped manner and are arranged concentrically to one another. The central feed-through 57 which is formed in the rotor is taken up by a centrally arranged rotation feed-through 58 for the supply conduits 19 for media and electrical energy as well as for control leads. Herein, at least one pair of first supply conduits for the supply and discharge of cooling water, at least one pair of second supply conduits for the supply and discharge of hydraulic oil, at least one supply conduit for compressed air, at least one supply lead for electrical energy and at least one control lead are provided.

An injection moulding tool which is assembled on a suggested assembly appliance, permits a pre-adjustment of first and second mould tool parts outside an injection moulding machine. The assembly appliance has its own translatory displacement system and an independent rotation drive, so that the injection moulding tool can be operated largely independently of the drives of the injection moulding machine. The drive system of the injection moulding machine is, for example, only necessary for the feed of the closure plate or the translatorily dislaceable mould clamping plate onto the injection moulding tool. Due to the assembly of the essential constituents of the injection moulding tool on an assembly appliance according to exemplary embodiments of the present disclosure, the effort for the adjustment of the injection moulding tool itself and in relation to the injection moulding machine components can be reduced. Fitting and retrofitting times of the injection moulding machine can be shortened by way of this. The constituents of the injection moulding machine which are arranged on the suggested assembly appliance can have a very high intrinsic stiffness. An upper-lying counter-support, such as e.g. additional tie-bars (FIG. 2) or mountings for preventing a tilting can be forgone independently of the tool weight.

The invention has been described by way of exemplary embodiments of an injection moulding machine and exemplary embodiment of an injection moulding tool. It is to be understood that the represented embodiment variants can include modifications which can be understood by the person skilled in the art with the knowledge of the invention as disclosed herein. The embodiments represented by way of example are therefore not to be seen as being restrictive. In contrast, the scope of protection is defined by the patent claims and by equivalents of features thereof.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An assembly appliance for mould tool parts of an injection moulding tool, the assembly appliance comprising:
   an assembly plate;
   an assembly frame with an upper side;
   the assembly plate includes a tool carrier for receiving first mould tool parts to be assembled, the assembly plate being configured for insertion into an injection moulding machine;
   a displacement plate, the assembly plate being rotatably mounted on the displacement plate; and
   the assembly frame having a support device for stationary support of a second mould tool part which corresponds to at least one of the first mould tool parts,
   wherein for a translatory displacement of the displacement plate along a longitudinal extension of the assembly frame for displacement of the assembly plate relative to the second mould tool part a guide system is arranged on the upper side of the assembly frame, the guide system includes two guide rails which run parallel to one another and onto which the displacement plate is mounted.

2. An assembly appliance according to claim 1, wherein the assembly frame comprises:
   a lower side facing away from the assembly plate; and
   support elements configured to a machine bed of the injection moulding machine and being assembled on longitudinal sides of the assembly frame on its lower side.

3. An assembly appliance according to claim 1, wherein the assembly frame on a longitudinal end comprises:
   a face side configured for releasable connection to a fixed mould clamping plate of an injection moulding machine.

4. An assembly appliance according to claim 1, wherein the guide system of the assembly frame comprises:
   an adjustment appliance for the assembly plate.

5. An assembly appliance according to claim 1, wherein the assembly plate is assembled on a rotation unit which passes through the displacement plate and is rotatable about a rotation axis which runs perpendicular to an upper side of the displacement plate.

6. An assembly appliance according to claim 5, wherein the rotation unit is a multi-pole electric motor which comprises:
   a stator and a rotor, the motor being a torque motor with an internal rotor construction manner, wherein the rotor is connected to the assembly plate in a rotationally fixed manner.

7. An assembly appliance according to claim 6, comprising:
   a first absolute sensor, configured as a rotation angle sensor for monitoring rotation movement of the electric motor.

8. An assembly appliance according to claim 4, wherein the support device for the second mould tool part is a carrier slide which is supported on the guide rails, and the assembly plate and a connection device are arranged on the assembly frame, the assembly plate being translatorily displaceable with respect to a stationary mould clamping plate of an injection moulding machine.

9. An assembly appliance according to claim 1, wherein the adjustment appliance for translatorily displaceable displacement of the assembly plate is a linear motor.

10. An assembly appliance according to claim 9, comprising:
    a second absolute sensor for monitoring translatory displacement of the displacement plate.

11. An assembly appliance according to claim 6, wherein the torque motor is of an internal rotor construction manner and comprises:
    a rotor configured as a hollow cylinder and which includes a centrally arranged feed-through for supply conduits/leads for media and electrical energy, as well as for control leads.

12. An assembly appliance according to claim 11, comprising:
    at least one pair of first supply conduits for feed and discharge of cooling water;
    at least one pair of second supply conduits for feed and discharge of hydraulic oil;
    at least one supply conduit for compressed air;
    at least one supply lead for electrical energy; and
    at least one control lead.

13. An assembly appliance according to claim 11, wherein the feed-through is a rotation feed-through.

14. An injection moulding tool comprising:
a first mould tool part; and
at least one second mould tool part, wherein a closed state of the first and at least one second mould tool parts delimit at least one mould cavity, wherein the at least one second mould tool part is assembled on a stationary mould clamping plate of an injection moulding machine, wherein the first mould tool part is assembled on a tool carrier which is assembled on an assembly plate and the at least one second mould tool part is assembled on a support device of an assembly appliance according to claim 1.

15. An injection moulding tool according to claim 14, wherein the tool carrier is configured in a prismatic manner and is configured to be rotatable in a predefined manner about a rotation axis which runs perpendicular to a displacement plane.

16. An injection moulding tool according to claim 15, wherein the tool carrier comprises:
   at least 4 side surfaces which run parallel to the rotation axis; and
   first mould tool parts assembled at least on two side surfaces which lie opposite one another.

17. An injection moulding tool according to claim 16, wherein the tool carrier is configured to be translatorily and rotationally displaceable essentially simultaneously.

18. An injection moulding tool according to claim 15, comprising:
   at least one valve block for a feed, discharge and distribution of a hydraulic medium;
   a cooling fluid and compressed air arranged to be last least one of within or on an upper side of the tool carrier which lies opposite the assembly plate.

19. An injection moulding tool with an assembly appliance for an injection moulding tool according to claim 1, in combination with an injection moulding machine which comprises:
   a translatorily displaceable mould clamping plate, wherein the assembly plate is configured for a translatory displacement which is essentially parallel to a translatory displacement direction of the mould clamping plate.

20. An injection moulding tool and machine according to claim 19, wherein the translatorily displaceable mould clamping plate is configured to be displaced from a closed position into an open position, and vice versa, by a predefined first distance, and wherein the assembly plate is configured to be displaced from a closed position into an open position, and vice versa, by a second distance, wherein the first distance is essentially twice as large as the second distance.

21. An injection moulding tool and machine according to claim 20, wherein the assembly plate is configured for a rotatory movement, such that the translatory displacement and the rotatory movement of the assembly plate will be effected essentially simultaneously.

22. An injection moulding machine in combination with an injection moulding tool according to claim 14, wherein the injection moulding machine comprises:
   a mould clamping plate which is translatorily displaceable along guide rail; and
   a stationary mould clamping plate, wherein the injection moulding tool lies on the guide rails and is releasably connected to the stationary mould clamping plate.

* * * * *